Patented Jan. 26, 1943

2,309,612

UNITED STATES PATENT OFFICE 2,309,612

PROCESS OF COATING HOLLOW TUBES

George E. Holman, Melrose, Mass., assignor to Sylvania Electric Products Inc., a corporation of Massachusetts No Drawing. Application November 22, 1940, Serial No. 366,712

2 Claims. (Cl. 117—97)

This invention relates to processes for coating the interior surfaces of hollow glass bodies, such as the envelopes of electric discharge lamps, with luminescent material.

Such material emits visible light when excited by invisible radiations, such as cathode rays or ultra violet rays; and a coating of the proper material on the inner surface of the light-transmitting envelope of an electric discharge device enables the conversion into visible light of invisible radiations produced by the discharge. The luminescent material is generally an inorganic crystal, ground to a powder so that it may be applied to the tube; and in the finished coating the particles of the powder must not be covered by a binder which absorbs the desired exciting radiation. In practice, therefore, the coating is generally composed of the powder particles themselves, free from binder, and held to the envelope, which is generally of glass, by some peculiar adhesive action produced by the method of coating and the particle size. In a long, tubular envelope a coating uniform in arrangement of particles and in thickness from end to end of the envelope is difficult to produce, the difficulty increasing with the length of the tube and the smallness of its diameter; and yet long, tubular envelopes are necessary for certain types of discharge lamps.

An object of the present invention is a method by which the interior surface of such long, tubular envelopes can be uniformly coated from end to end; and a further object is a method by which a coating free from mottling, "comb-marks" and taper can be produced. A mottled coating is one composed of separate clusters of particles, rather than of uniformly-spaced separate particles; comb-marks are longitudinal fissures in the coating which look as if a comb had been run through it; and a tapered coating is thicker at one part of the tube than at another, the thickest portion not necessarily being at either end of the tube.

A feature of the invention is the suspension of fine luminescent particles uniformly in a viscous vehicle and another feature is the application of such a suspension to the interior of the device to be coated, and drying the suspension at a controlled rate. A further feature is the use of a high viscosity nitrocellulose in a slow-drying vehicle as the suspending medium.

A further feature of the invention is a reversal in position of the tube being coated shortly after some of the initial draining has occurred, but before all the draining has stopped. Still another feature is the application to the tube of a double flushing with the coating medium.

Other objects, advantages and features of the invention will be apparent from the following specification:

I may, for example, dissolve 75 grams of 12000 second viscosity nitrocellulose in 152 grams of amyl acetate, with 4.5 grams of di-ethyl phthallate, a plasticizer and mix 60 grams of a luminescent material of about 5 microns average particle size.

I may, place the tube, whose interior is to be coated, in a vertical position and force the foregoing suspension up into the tube as far as the tube is to be coated.

In order to insure an adequate initial coating of the top of the tube, it is advisable, after raising the suspension to the top, to lower it about a quarter of its height, and then raise it to the top again. The column of suspension in the tube is then allowed to drain out. The tube is allowed to stand for a short period, about half a minute, although the exact period is not extremely critical to allow some initial draining to occur, and is then reversed, so that what was originally its top becomes its bottom, and the remainder of the draining and drying occurs in the opposite direction, with respect to the tube itself, than the initial draining. Thus the top of the tube, which is thickened out by the initial draining, becomes the bottom after reversal and the draining from the other end of the tube flows down over it, some of it remaining on it to thicken it again. The time of reversal of the tube may be chosen so that the initial thinning, and eventual thickening of the coating will be balanced, giving a uniform thickness of coating from end to end of the tube.

The tubing is then dried slowly, preferably by being placed in an enclosure which is ventilated by a gentle draft, which draft is preferably produced by suction at the bottom of the enclosure.

By drying of the tube is meant, of course, the evaporation of the amyl acetate; the plasticizer will evaporate much more slowly, so the tube will not be absolutely dry when the amyl acetate evaporates. If it were, the nitrocellulose and fluorescent material left would peel off the tube in a sheet.

After drying as described, the tube is baked in an oven at about 500° C. to decompose the nitrocellulose, and remove the residue by oxidation, leaving only the fluorescent material on the inside of the tube in a firmly adherent coating. In order that the fluorescent material and nitrocellulose shall not peel off during the baking step, the plasticizer must be one that will not evaporate completely or decompose before the nitrocellulose decomposes. A suitable plasticizer is di-ethyl phthallate.

To insure the removal of the decomposed residue of the nitrocellulose, a stream of heated air should be passed through the tubing when it is in the baking oven. The air stream must be preheated, if the coating is not to be spoiled.

Instead of being flushed up into the tube from the bottom, and out again at the bottom, the coating suspension may be sprayed onto the top of the tube and allowed to drain downward over the tube. The draining could then be allowed to progress for a while, the tube reversed, and then dried.

If the tubing dries much before being reversed, the effect may be spoiled. Accordingly, a slow-drying solvent, such as amyl or butyl acetate may be used to insure that the drying is slow enough. If a fast-drying solvent, such as acetone is used, the initial drying will have to be slowed up, for example by keeping the atmosphere which flows into the tube saturated with acetone.

In the case of a 48 inch long, 1½ inch diameter tube, with the coating solution specified at the beginning of this specification, a delay of about half a minute before reversing the tube has proven correct.

The drying time for the tube was about one hour. The initial drying after reversal must be slow to produce a uniform coating. Once the coating has dried to a condition where its viscosity has become so great that no appreciable draining occurs thereafter, further drying may be speeded up by increasing the draft of air through the tube, thus a drying time of much less than an hour can be obtained.

The foregoing method should be carefully distinguished from any method in which the tubing is completely coated and dried once, and then given a second coat. In the present method the tubing is only coated once and dried once. It is thus free from the streaks which tend to appear in a double coating, and from any tendency of the two layers to separate; and in addition is more suitable for production, since it allows a tube to be coated in half the time, without making the thickness of coating different from point to point on the tube.

Pent-acetate may, of course, be used instead of amyl acetate.

What I claim is:

1. The process of coating the interior of an elongated hollow tube with fluorescent material, with said tube having dimensions of the order of 48 inches in length and 1.5 inches in diameter, said process comprising: placing said tube in a vertical position; coating the interior of said tube with a suspension comprising 75 grams of 12,000 second viscosity nitrocellulose in 152 grams of amyl acetate, with 4.5 grams of di-ethyl phthalate, a plasticizer, and 60 grams of a luminescent material having an average particle size of the order of 5 microns; draining the tubing for about half a minute; reversing the tubing so that what was at first its top becomes its bottom; draining the tubing further; and thereafter applying drying means to said tube.

2. The process of covering the interior of an elongated hollow tube with a single, integral, and substantially homogeneous coating of fluorescent material of substantially uniform thickness throughout, said method comprising: locating said tube longitudinally in a substantially fixed and vertical position; applying, in a fluid state, a quantity of a suspension of fluorescent material in a liquid vehicle, to the inner surface of said tube in such a manner as to substantially completely cover said surface; holding said tube in said fixed, vertical position for a relatively short time, during which said suspension is still fluid and is draining toward the lower end of the tube, yet leaving a covering on said inner surface; reversing the ends of said tube while said suspension is still fluid; holding said tube in said reversed position while a portion of said quantity of said suspension flows back over the inner surface of said tube and joins with that portion of said quantity of said suspension which already covers said surface, to form a single, integral and homogeneous layer; and thereafter applying drying means to said layer.

GEORGE E. HOLMAN.